(12) United States Patent
Ploshykhyn

(10) Patent No.: US 9,773,035 B1
(45) Date of Patent: Sep. 26, 2017

(54) SYSTEM AND METHOD FOR AN ANNOTATION SEARCH INDEX

(71) Applicant: YANDEX EUROPE AG, Lucerne (CH)

(72) Inventor: Vyktor Vitalyevich Ploshykhyn, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/510,770

(22) PCT Filed: Oct. 13, 2015

(86) PCT No.: PCT/IB2015/057820
§ 371 (c)(1),
(2) Date: Mar. 13, 2017

(87) PCT Pub. No.: WO2016/198927
PCT Pub. Date: Dec. 15, 2016

(30) Foreign Application Priority Data

Jun. 9, 2015 (RU) ................................ 2015121844

(51) Int. Cl.
*G06F 17/30* (2006.01)

(52) U.S. Cl.
CPC .. *G06F 17/30321* (2013.01); *G06F 17/30011* (2013.01); *G06F 17/30457* (2013.01); *G06F 17/30525* (2013.01)

(58) Field of Classification Search
CPC ......... G06F 17/30011; G06F 17/30622; G06F 17/30731; G06F 17/30684; G06F 17/30864; G06F 17/30321
(Continued)

(56) References Cited

U.S. PATENT DOCUMENTS 5,237,499 A * 8/1993 Garback ................ G06Q 10/02
                                                              705/5
7,231,375 B2 * 6/2007 Ratnaparkhi ..... G06F 17/30654
                                                              706/11
(Continued)

FOREIGN PATENT DOCUMENTS

RU            2473119 C1      1/2013

OTHER PUBLICATIONS

International Search Report with regard to PCT/IB2015/057820 dated Mar. 1, 2016.
(Continued)

*Primary Examiner* — Shahid Alam
(74) *Attorney, Agent, or Firm* — BCF LLP

(57) ABSTRACT

There is disclosed a method and a system for generating an annotated search index. The method is executable at a server. The method comprises retrieving a portion of a historical search session for a first search query, the portion including a first resource and a second resource, both the first and the second resource being relevant to the first search query; generating an association parameter for the second resource, the association parameter being based on a first historical parameter and a second historical parameter; and, responsive to the association parameter for the second resource being above a predetermined threshold, associating the second resource with one or more of the first resource and the included search terms, thereby generating an annotated search index for the included search terms.

20 Claims, 4 Drawing Sheets

(58) Field of Classification Search
USPC ....... 707/706, 722, 728, 734, 742, 749, 765, 707/769, 741
See application file for complete search history.

(56) References Cited

U.S. PATENT DOCUMENTS

| | | | |
|---|---|---|---|
| 7,257,591 B2* | 8/2007 | Drucker | G06F 17/30333 707/802 |
| 7,257,774 B2* | 8/2007 | Denoue | G06F 17/30017 707/E17.009 |
| 7,308,643 B1 | 12/2007 | Zhu et al. | |
| 7,340,454 B2* | 3/2008 | Wu | G06F 17/30864 707/711 |
| 7,636,714 B1* | 12/2009 | Lamping | G06F 17/3064 707/716 |
| 7,644,065 B2* | 1/2010 | Wu | G06F 17/30864 707/769 |
| 8,095,538 B2 | 1/2012 | Hawking | |
| 8,095,545 B2 | 1/2012 | Telloli et al. | |
| 8,266,130 B2* | 9/2012 | Jones | G06F 17/30864 707/706 |
| 8,269,790 B2* | 9/2012 | Wong | G06T 11/206 345/619 |
| 8,271,475 B2* | 9/2012 | Hamilton, II | G06F 17/3066 707/710 |
| 8,307,005 B1 | 11/2012 | He et al. | |
| 8,321,470 B2* | 11/2012 | Cragun | G06F 17/30067 707/803 |
| 8,930,359 B1 | 1/2015 | Mysen et al. | |
| 9,183,312 B2* | 11/2015 | Dasher | G06F 17/30867 707/741 |
| 2004/0260714 A1* | 12/2004 | Chatterjee | G06F 17/30873 707/741 |
| 2006/0101012 A1 | 5/2006 | Carson et al. | |
| 2007/0022135 A1 | 1/2007 | Malik | |
| 2007/0038608 A1 | 2/2007 | Chen | |
| 2007/0156669 A1 | 7/2007 | Marchisio et al. | |
| 2010/0057800 A1 | 3/2010 | Hawking | |
| 2011/0196602 A1 | 8/2011 | Pfeifle et al. | |
| 2013/0132381 A1 | 5/2013 | Chakrabarti et al. | |
| 2013/0173569 A1 | 7/2013 | Pearcy | |
| 2015/0012560 A1 | 1/2015 | Franosch et al. | |

OTHER PUBLICATIONS

International Preliminary Report on Patentability with regard to PCT/IB2015/057820 dated Nov. 29, 2016.

* cited by examiner

SYSTEM AND METHOD FOR AN ANNOTATION SEARCH INDEX

CROSS-REFERENCE

The present application claims priority to Russian Patent Application No 2015121844, filed Jun. 9, 2015, entitled "A SYSTEM AND METHOD FOR AN ANNOTATION SEARCH INDEX" the entirety of which is incorporated herein.

FIELD

The present technology relates to search engines in general and specifically to a method and apparatus for generating an annotated search index.

BACKGROUND

The Internet provides access to a wide variety of resources, for example, video files, image files, audio files, or Web pages, including content for particular subjects, book articles, or news articles. A search engine can select one or more resources in response to receiving a search query. A search query is data that a user submits to (or causes, knowingly or unknowingly, to be submitted to or obtained by) a search engine to conduct a search to satisfy the user's informational needs. Search queries almost always include data in the form of text—e.g., one or more search query terms—as well as other information. The search engine selects and scores resources based on their relevance to the search query and on their importance relative to other resources to provide search results that link to the selected resources. The search results are typically ranked according to the scores and presented according to this order.

Today's large data centers manage collections of data comprising billions of data items. In such large collections, searching for particular items that meet conditions of a given search query is a task that consumes a significant amount of computing resources. It also takes a noticeable amount of time, even on the most powerful multiprocessor computer systems. In many applications, search query response time is critical, either because of specific technical requirements, or because of high expectation from human users. Various conventional methods are used to reduce search query execution time.

Typically, in building a search-efficient data collection management system, data items are indexed according to some or all of the possible search terms that may be contained in search queries. An "inverted index" of the data collection is created (and maintained and updated) by the system for use in the execution of search queries. An inverted index comprises a number of "posting lists". Each posting list corresponds to a search term and contains references to the data items that include that search term (or otherwise satisfy some other condition that is expressed by the search term). For example, if data items are text documents, as is often the case for Internet search engines, then search terms are individual words (and/or some of their most often used combinations), and the inverted indexes have one posting list for every word that has been encountered in at least one of the documents. In another example, the data collection is a database comprising one or more very long tables. The data items are individual records (i.e., the lines in a table) having a number of attributes represented by some values in the appropriate columns of the table. The search terms are specific attribute values, or other conditions or attributes. The posting list for a search term is a list of references (indexes, ordinal numbers) to records that satisfy the search term.

To speed up execution of search queries, the inverted index is typically stored in a fast access memory device (e.g., RAM) of one or more computer systems, while the data items themselves are stored on larger but slower storage media (e.g., on magnetic or optical disks or other similar large capacity devices). In this way, the processing of a search query will involve searching through one or more posting lists of the inverted index in the fast access memory device rather than through the data items themselves (in the slower access storage device). This generally allows search queries to be performed at a much higher speed.

Given the volume of information available via the Internet, and the lack of consistency between various resources, it is not always easy for a user to formulate search query terms that will quickly and easily provide them with the information that they seek. Further, in many cases a resource of interest to the user is not associated directly with the search terms in the search query or with search query suggestions. A highly relevant page may not be included in the posting lists for the search query and thus cannot be found by means of the usual inverted index. For example, a highly relevant document may be a web resource containing only a picture-diagram which does not include any textual signs of reference to the search query (such as URL, name, etc.).

There is a need to improve upon existing search engine technology in order to provide more complete search results and more satisfactory search experience to users.

U.S. Patent Application Publication No. 2007/0038608 describes a computer search system for improved web page ranking and presentation based on additional information related to the contents of the retrieved documents. The additional information is directly related to the contents of the retrieved web pages but does not appear on the retrieved web pages and/or in the link structure. The new search system searches a conventional web page collection together with databases containing publications and semantic web data, which provides the aforesaid additional information. The concept related information is then used in determining the final page rank, which results in more relevant and objective page ranking.

U.S. Patent Application Publication No. 2013/0132381 describes a system for tagging entities with descriptive phrases. A plurality of description phrases associated with a first domain may be determined, based on an analysis of a first plurality of documents to determine co-occurrences of the description phrases with one or more name labels associated with the first domain. An entity associated with the first domain may be obtained. An analysis of a second plurality of documents may be initiated to identify co-occurrences of mentions of the obtained entity and one or more of the plurality of description phrases, and contexts associated with each of the co-occurrences of the mentions and description phrases, in each one of the second plurality of documents. A description tag association between the obtained entity and one of the description phrases may be determined, based on analysis of the identified contexts.

U.S. Pat. No. 8,095,538 teaches an annotation index system and method. There is described a method of encoding on a computer system for information retrieval in an inverted list structure of annotation, including collecting a group of documents and storing them in a digital format, determining a group of annotations referencing the group of documents, and forming a snippet index by grouping the group of annotations by unique annotation identifier. The method also includes forming a snippet dictionary which, for each unique annotation identifier, indexes a corresponding position in the snippet index for the group of annotations having that unique annotation identifier.

SUMMARY

It is an object of the present invention to ameliorate at least some of the inconveniences present in the prior art.

In one aspect, implementations of the present technology provide a method of generating an annotated search index. The method can be executable at a server. The method comprises: retrieving a portion of a historical search session for a first search query, the portion including a first resource and a second resource, both the first and the second resource being relevant to the first search query, the first resource including at least some of the search terms from the first search query and having been indexed to the included search terms in a first search index, the second resource having none of the search terms of the first search query and not having been indexed to the search terms in the first search index; generating an association parameter for the second resource, the association parameter being based on a first historical parameter and a second historical parameter; and, responsive to the association parameter for the second resource being above a predetermined threshold, associating the second resource with one or more of the first resource and the included search terms, thereby generating the annotated search index for the included search terms.

The first historical parameter is a number of transitions between the first resource and the second resource in the historical search session. The second historical parameter is a prior user time spent interacting with the second resource in the historical search session.

In some implementations, the association parameter is above the predetermined threshold when the first historical parameter is one of 1, 2, and 3 transitions and the second historical parameter is at least 30 seconds. In other implementations, the association parameter is above the predetermined threshold when the first historical parameter is one of 1 and 2 transitions and the second historical parameter is at least 30 seconds. The number of transitions between the first search query and the first resource is generally one but in some implementations it may be more than one.

In some implementations, the annotated search index is generated by associating the second resource with both the first resource and the included search terms. In alternative implementations, the annotated search index is generated by associating the second resource with one or more of the first resource and the included search terms.

In some implementations, the first and the second resource are, independently, one or more of a document, an image, an audio file, a web page, a tweet, a link, a document heading, and a document fragment.

In an embodiment, the first search index is an inverted index; the first resource and the included search terms are associated together in a posting list(s) in the inverted index; and a reference to the second resource is inserted into the appropriate posting list(s) in the inverted index, thereby generating the annotated search index. In an alternative embodiment, the second resource is associated with the one or more of the first resource and the included search terms in a second search index, the generated annotated search index comprising the second search index and being distinct from the first search index. The second search index may be, for example, a data array having 3 or 4 dimensions (i.e., 3 or 4 layers of data). The 3 or 4 dimensions may comprise one or more of docID, breakID, regionID, and sourceID.

In another aspect, implementations of the present technology provide a system for generating an annotated search index, the system comprising a server. The server comprises a communication interface for communication via a communication network with a search cluster having access to a database, a memory storage, and a processor operationally connected with the communication interface and the memory storage, the processor being configured to store objects on the memory storage. The processor is further configured to: retrieve a portion of a historical search session for a first search query, the portion including a first resource and a second resource, both the first and the second resource being relevant to the first search query, the first resource including at least some of the search terms from the first search query and having been indexed to the included search terms in a first search index, the second resource having none of the search terms of the first search query and not having been indexed to the search terms in the first search index; generate an association parameter for the second resource, the association parameter being based on a first historical parameter and a second historical parameter; and, responsive to the association parameter for the second resource being above a predetermined threshold, associate the second resource with one or more of the first resource and the included search terms, thereby generating an annotated search index for the included search terms.

In some implementations, the processor is configured to associate the second resource with both the first resource and the included search terms to generate the annotated search index. In other implementations, the processor is configured to associate the second resource with one or more of the first resource and the included search terms to generate the annotated search index.

In an embodiment, the first search index is an inverted index; the first resource and the included search terms are associated together in a posting list(s) in the inverted index; and the processor is configured to insert a reference to the second resource into the appropriate posting list(s) in the inverted index, thereby generating the annotated search index. In another embodiment, the processor is configured to associate the second resource with the one or more of the first resource and the included search terms in a second search index, the generated annotated search index comprising the second search index and being distinct from the first search index. The second search index may be, for example, a data array having 3 or 4 dimensions, the 3 or 4 dimensions comprising one or more of, e.g., docID, breakID, regionID, and sourceID.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests, retrieval of historical search sessions) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "a server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, and as was discussed hereinabove, a "posting list" for a given search term is typically a list of references to the data items in the data collection that include that search term. As such, one will understand that the more common the search term, the greater the number of references there will be in the posting list. For a ubiquitous search term, e.g., the English word "the", the posting list will include a reference to every data item in the data collection. For almost all other search terms this is not the case, however, and there will be gaps between data items in the data collection containing that search term formed by those data items that do not. Thus, for example, assuming the references in the posting list were to document numbers, there will be corresponding gaps in the document numbers in the posting list.

A posting list for a given common search term (i.e., a search term found in relatively many, but not all, of the documents) will contain references, in the form of the document numbers, to those documents in which the search term occurs. The references in the posting list are themselves in numerical order, although there will be gaps between the document numbers as the search term does not occur in documents having the skipped document numbers that form the gaps. The length of a posting list will vary, depending on the number of data items in the data collection that include the search term. As such, the length of a posting list may even be zero, which would be the case if no documents within the data collection contain occurrences of the search term in question.

In the context of the present specification, and as was discussed hereinabove, an "inverted index" comprises a number of posting lists.

In some embodiments, each of the plurality of posting lists corresponding to the plurality of search terms references a plurality of indexed items, the indexed items being sequentially numbered. As was discussed above, this is typically the case when dealing with Internet search engines, where the indexed items are sequentially numbered with document numbers.

In some embodiments, each of the plurality of posting lists corresponding to the plurality of search terms references a plurality of indexed items, the indexed items being ordered in an order of decreasing query-independent relevance. This is typically the case in respect of Internet search engines, in which the index items are not randomly inserted into the data collection. Typically, the items in the data collection are ordered within the data collection in an order of decreasing query-independent relevance. In this manner, the data items that are statistically more likely to be part the search results of any given search query will be arranged so as to be searched towards the beginning of the search. They are thus likely to be located more quickly than if the data in the data collection had been randomly entered.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
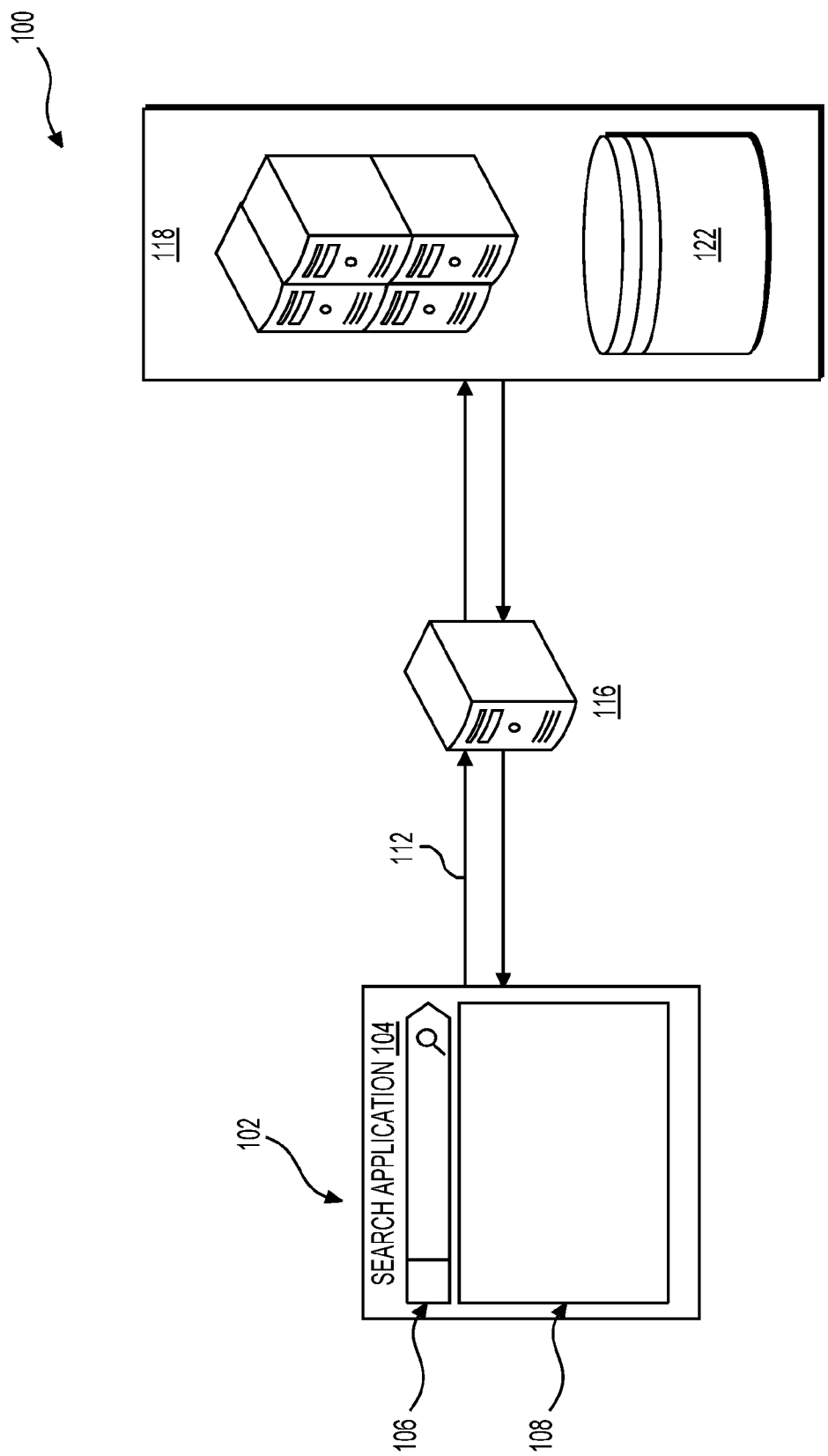
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth herein below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to receive search queries and to conduct searches (e.g., general searches, vertical searches) in response thereto, as well as to generate annotated search indexes in accordance with non-limiting embodiments of the present technology. As such, any system variation configured to process user search queries and generate annotated search indexes can be adapted to execute embodiments of the present technology, once teachings presented herein are appreciated.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered, or the like.

The implementation of the electronic device 102 is not particularly limited, but as an example, the electronic device 102 may be implemented as a personal computer (desktops, laptops, netbooks, etc.), a wireless communication device (such as a smartphone, a cell phone, a tablet and the like), as well as network equipment (such as routers, switches, and gateways). The electronic device 102 comprises hardware and/or software and/or firmware (or a combination thereof), as is known in the art, to execute a search application 104. Generally speaking, the purpose of the search application 104 is to enable the user (not depicted) to execute a search, such as a web search using a search engine.

How the search application 104 is implemented is not particularly limited. One example of the search application 104 may include a user accessing a web site associated with a search engine to access the search application 104. For example, the search application can be accessed by typing in an URL associated with Yandex™ search engine at www.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited to) those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

Generally speaking, the search application 104 comprises a search query interface 106 and a search result interface 108. The general purpose of the search query interface 106 is to enable the user (not depicted) to enter his or her query or a "search string". The general purpose of the search result interface 108 is to provide search results that are responsive to the user search query 210 entered into the search query interface 106.

Also coupled to the communication network is a server 116. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware. In the depicted non-limiting embodiments of the present technology, the server 116 is a single server. In alternative non-limiting embodiments of the present technology, the functionality of the server 116 may be distributed and may be implemented via multiple servers.

The electronic device 102 is configured to communicate with the server 116 over a communication link 112. Generally speaking, the communication link 112 enables the electronic device 102 to access the server 116 via a communication network (not depicted). In some non-limiting embodiments of the present technology, the communication network (not depicted) can be implemented as the Internet. In other embodiments of the present technology, the communication network (not depicted) can be implemented differently, such as any wide-area communication network, local-area communication network, a private communication network and the like.

How the communication link 112 is implemented is not particularly limited and will depend on how the electronic device 102 is implemented. Merely as an example and not as a limitation, in those embodiments of the present technology where the electronic device 102 is implemented as a wireless communication device (such as a smartphone), the communication link 112 can be implemented as a wireless communication link (such as but not limited to, a 3G communication network link, a 4G communication network link, Wireless Fidelity, or WiFi® for short, Bluetooth® and the like). In those examples where the electronic device 102 is implemented as a notebook computer, the communication link can be either wireless (such as Wireless Fidelity, or WiFi® for short, Bluetooth® or the like) or wired (such as an Ethernet based connection).

The server 116 is communicatively coupled (or otherwise has access) to a search cluster 118. According to these embodiments of the present technology, the search cluster 118 performs general and/or vertical searches in response to the user search queries inputted via the search query interface 106 and outputs search results to be presented to the user using the search result interface 108. Within these non-limiting embodiments of the present technology, the search cluster 118 comprises or otherwise has access to a database 122. As is known to those of skill in the art, the database 122 stores information associated with a plurality of resources potentially accessible via the communication network (for example, those resources available on the Internet). The database 122 also stores information and data such as features of the search histories pertaining to a particular search query 210 (i.e., historical search sessions), inverted indexes, and the like. The process of populating and maintaining the database 122 is generally known as "crawling".

The implementation of the database 122 is not particularly limited. It should be understood that any suitable hardware for storing data may be used. In some implementations, the database 122 may be physically contiguous with the search cluster 118, i.e., they are not necessarily separate pieces of hardware, as depicted, although they may be. In the depicted non-limiting embodiments of the present technology, the database 122 is a single database. In alternative non-limiting embodiments of the present technology, the database 122 may be segregated into one or more separate databases (not depicted). These segregated databases may be portions of the same physical database or may be implemented as separate physical entities. For example, one database within, let's say, the database 122 could host the inverted index, while another database within the database 122 could host the resources available, while yet another database within the database 122 could host the features of the search histories pertaining to particular search queries (i.e., the historical search sessions). Needless to say, the above has been provided as an illustration only and several additional possibilities exist for implementing embodiments of the present technology.

It should be expressly understood that in order to simplify the description presented herein below, the configuration of the search cluster 118 and the database 122 has been greatly simplified. It is believed that those skilled in the art will be able to appreciate implementational details for the search cluster 118 and for components thereof and for the database 122.

In general, a search query 210 may be considered to be a series of one or more search terms, and the search terms thereof may be represented as $T_1, T_2, \ldots T_n$. Thus, the search query 210 may be understood as a request to the search application 104 to locate every document within the data collection (not depicted) stored in the database 122 containing each and every one of the search terms $T_1, T_2, \ldots T_n$ (the logical equivalent of an "AND" between the search terms; i.e., every document resulting from the search must contain at least one occurrence of the word $T_i$, for every i from 1 to n). This is the simplest form of executing a search query 210.

Within these embodiments of the present technology, the server 116 is configured to access the search cluster 118 (to perform a general web search and/or a vertical search, for example, in response to the search query 210). Within the embodiment depicted in FIG. 1, the server 116 is generally configured to (i) conduct searches (by accessing the search cluster 118); (ii) execute analysis of search results and perform ranking of search results; (iii) group search results and compile the search results page (SERP) to be outputted to the electronic device 102 in response to the search query 210 (not depicted).

According to non-limiting embodiments of the present technology, the server 116 is further configured to generate an annotated search index by: retrieving a portion of a historical search session 200 for the search query 210 (the historical search session 200 being stored, e.g., in database 122); generating an association parameter for a related doc 280 identified in the historical search session 200 but having none of the terms in the search query 210; and, responsive to the association parameter being above a predetermined threshhold, associating the related doc 280 with the search query 210 or a first resource 220 to generate an annotated search index 300 (which may be stored, for example, in database 122). The annotated search index 300 is then available for use in conducting future user searches for the search query 210 in the context of system 100 as described above.

As is known to one skilled in the art, indexing is used to increase search efficiency of large data collections. Thus, one technological area in which the present technology may be of use is in the field of search applications that use, e.g., Internet search engines, as described above, although the present technology may be used in other fields as well (for example, with respect to large databases). Embodiments described herein refer to Internet search engines as they provide a good example for purposes of illustration and understanding, but the technology is not meant to be limited to Internet search engines.

An Internet search engine will typically have access (via search application 104 and server 116) to a data collection in database 122 including, amongst other things, a very large number of Internet webpages, which, together with their associated hyperlinks, may be referred to as "documents". Typically a data collection comprises other resources available on the Internet than just documents; for ease of understanding, in examples described herein we refer only to the documents, but it should be expressly understood that the present technology applies to all types of resources in the data collection. Non-limiting examples of other types of resources include images, audio files, web pages, tweets, links, document headings, and document fragments.

The documents are typically entered into the data collection via the execution of a background webpage indexing process that is generally referred to in the art as a "crawler". The total number of documents in the data collection to be indexed and rendered searchable may typically be anywhere from 10 billion to 100 billion, depending on a variety of factors such as, for example, the linguistic scope of the data collection (i.e., does the data collection contain documents in only one language or in several). In the non-limiting embodiment depicted in FIG. 1, the web crawler may be implemented as part of the search cluster 118, and feed its results into database 122. Typically the web crawler will perform systematic automatic browsing of the web in order to find new or recently modified webpages.

The process of indexing a document generally consists of determining which words (in whatever language), which web addresses (hyperlinks, also referred to herein as "links"), and/or which other special terms that are considered to be potential search terms, occur within the document. In some cases, some phrases (e.g., sequences of words) could also be considered search terms, and if so those phrases would themselves become part of the indexing process. In some document indexing processes, a search term will include different lexical representations, e.g., different grammatical forms of the same basic word. What will be used as search term and what will not is typically defined by a specific search policy of a given search engine. A public general-use Internet search engine service typically considers every word in any language as a valid search term.

For any given search term (e.g., a word, a hyperlink, a special term, or a phrase), the document indexing process builds and maintains a list of references to documents containing that search term—the posting list of that search term. Thus, a posting list for a search term for a data collection contains a reference to each document within that data collection in which that search term occurs at least once. The reference to a document (commonly called a "posting"—hence the term "posting list") may be, e.g., that document's document number. Each posting list is ordered with the document numbers of the referenced documents being in ascending order. As an example, a posting list for a given term in a given data collection may start with document number 5, and include, in order, document numbers 7, 8, 40, 41, 64, and so on. The list would not include any number less than 64 not mentioned (as in this example the search term did not occur on those documents with those document numbers). Thus, such a posting list may be represented as {5, 7, 8, 40, 41, 64, . . . }.

With respect to the execution of a search query, a sample query $Q=\{T_1, T_2, T_3\}$ should be understood as "find all documents having occurrences of each of the search terms (typically words) $T_1$, $T_2$, and $T_3$". It should also be understood that the posting lists that correspond to these search terms will be denoted $P_1$, $P_2$, and $P_3$, respectively. This is a particular case of a more general search query $Q=\{T_1, T_2, \ldots T_n\}$ with n search terms. This particular case is considered only for the sake of simplicity and illustration.

The search query execution procedure is an iterative process that will create a new posting list R containing the results of the search that are found, i.e., the document numbers of those documents (in ascending order) that satisfy all the search criteria of the query Q (i.e., in which each of the search terms—$T_1$, $T_2$, $T_3$ in the previous example— occurs).

Many systems for document indexing are generally known and it is believed that those skilled in the art will be able to appreciate implementational details for creation and maintenance of the document indexing system.

Figure 2:
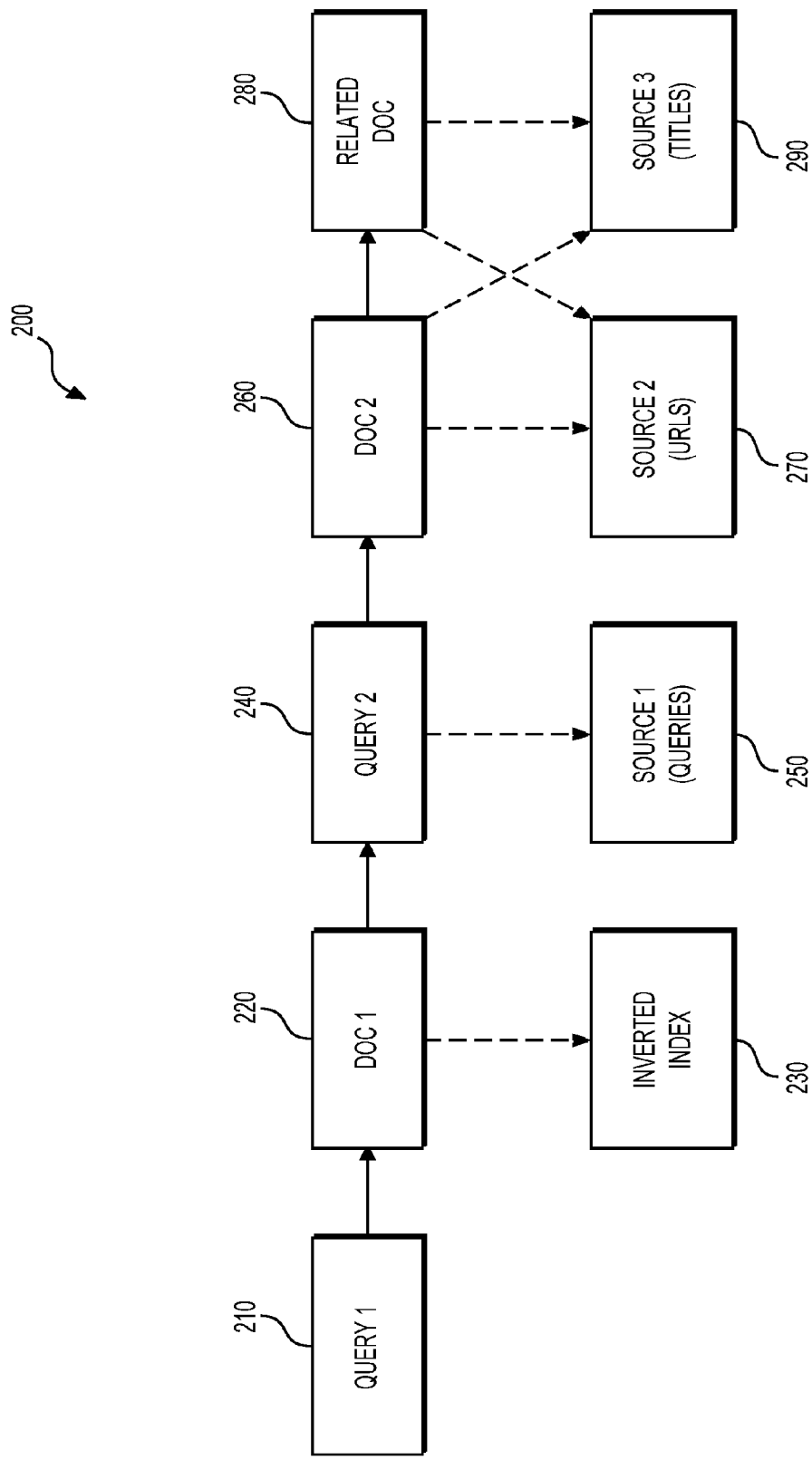
FIG. 2 is a schematic representation of a historical search session in accordance with non-limiting embodiments of the present technology.

For ease of illustration and as an aid to understanding, a schematic diagram depicting a historical search session 200 for a first search query ("query1") (210) is shown in FIG. 2. In the historical search session 200, the first document ("doc1") 220 was retrieved and displayed in the search result interface 108 after the query1 210 was entered in the search query interface 106, due to the posting of the doc1 220 with the query1 210 in the inverted index 230. After transitioning to doc1 220, the user then reformulated query1 210 as query2 240. In response to query2 240, the second document ("doc2") 260 was retrieved and displayed in the search result interface 108. From the doc2 260, the user then transitioned to the related document ("related doc") 280.

Thus, in the embodiment shown in FIG. 2, the number of transitions between the doc1 220 and the related doc 280 is three. It should be understood that historical search session 200 is shown for illustrative purposes only, and many other permutations and variations are possible.

In the historical search session 200, even though related doc 280 does not include any of the search terms in query1 210, and even though the transition to related doc 280 was only executed after execution of query2 240, related doc 280 is nevertheless relevant to the initial search query (query1 210). It is thus desirable in this example to generate an annotated search index 300 in which related doc 280 is associated with one or more of the query1 210 and the doc1 220 to improve the completeness of future searches.

In some non-limiting embodiments, the annotated search index 300 is generated by inserting a reference to related doc 280 in the appropriate posting list(s) for the included search term(s) (which posting lists already include doc1 220) in the inverted index 230. In such embodiments, the annotated search index 300 can be considered to be an extension of the original inverted index 230.

In some embodiments, additional indexes related to the historical search session 200 are created. For example, in the embodiment shown in FIG. 2, there are created an index of queries ("Source 1") 250; an index of URLs ("Source 2") 270; and an index of titles ("Source 3") 290. In general, annotations of the same type (e.g., queries, documents and their parts) can be gathered into sources and consolidated in an annotated search index. By way of example, the following can be created (without limitation): a Wikipedia source containing headings of articles of Wikipedia, depicted in FIG. 2 as index of titles 290; a link index containing URLs to certain web resources, depicted in FIG. 2 as index of URLs 270; and a source of associated queries, depicted in FIG. 2 as index of queries 250. In some embodiments, such sources are annotations in an annotated search index such as annotated search index 300 (described further below).

Figure 3:
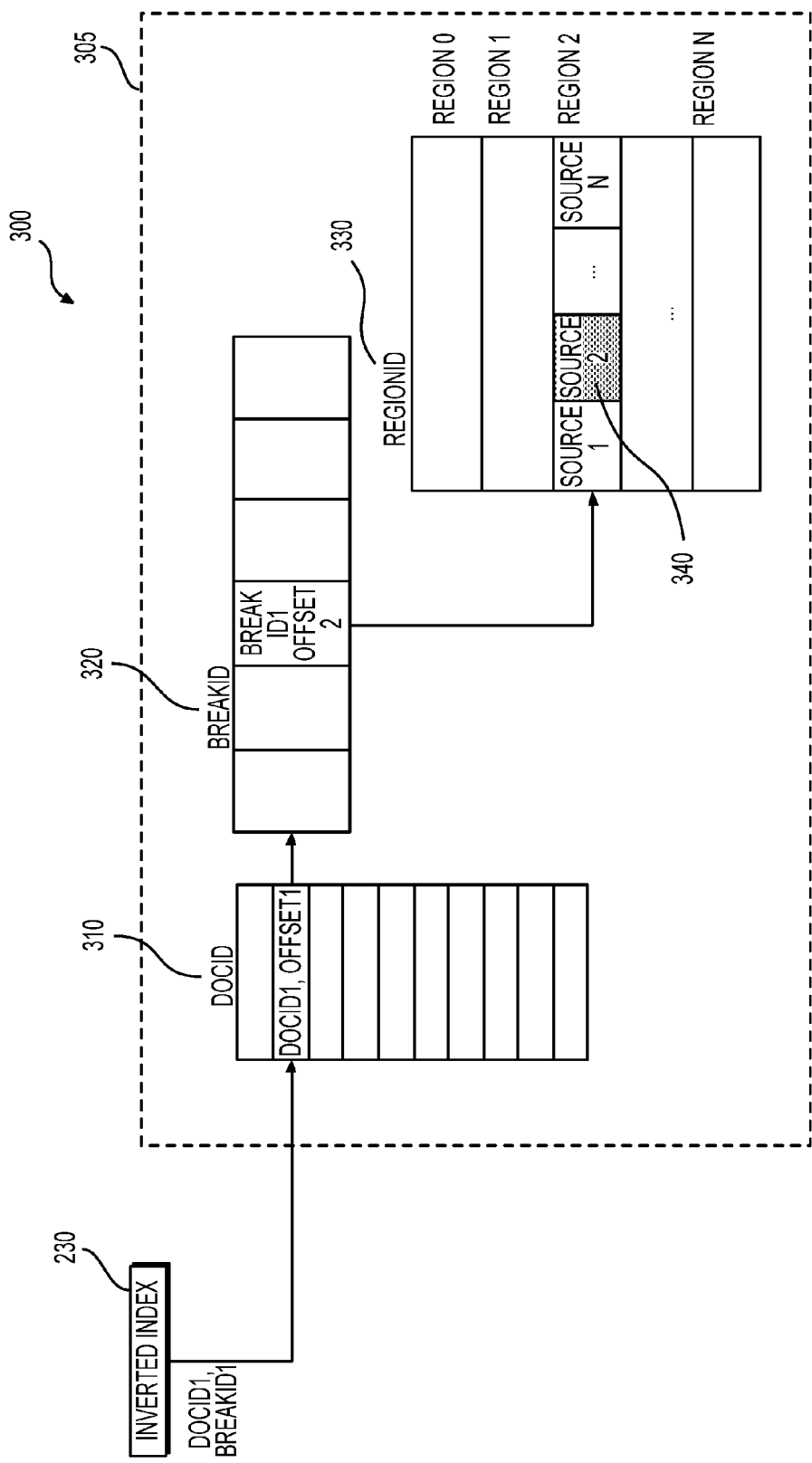
FIG. 3 is a schematic diagram depicting an annotated search index comprising a data array having four dimensions in accordance with non-limiting embodiments of the present technology.

In alternative non-limiting embodiments, the annotated search index 300 is generated as a second search index, in which related doc 280 is associated with one or more of the query1 210 and the doc1 220 in a data array. The second search index may be, for example, a separate database or index containing multiple layers of data or references to the related doc 280, such as a data array having 3 or 4 dimensions. For ease of illustration and as an aid to understanding, an example of such an annotated search index 300 comprising a data array 305 having 4 dimensions (also referred to herein as a "4D data array") is shown in FIG. 3, which depicts a schematic diagram of annotated search index 300 comprising 4D data array 305.

4D data array 305 contains 4 layers of data: a first layer 310 consisting of documents containing a line matching the query or a part of the query (docID); a second layer 320 containing lines (e.g., lemmata, phrases) of documents (breakID); a third layer 330 containing the regions of users who entered the queries (regionID); and a fourth layer 340 containing sources of annotations of a certain type (sourceID). During the query processing, query1 210 and associated doc1 220 are first located in standard inverted index 230, and the docID1 and breakID1 identifiers for doc1 220 are retrieved, shown schematically in boxes 310 and 320 respectively in FIG. 3. These identifiers lead to retrieval of the regionID for doc1 220, shown schematically in box 330. As per the docID, breakID, and regionID identifiers, the source of annotations identifiers (sourceIDs) are retrieved and stored as annotations (shown schematically in box 340).

In sum, the 4D data array 305 is a data array containing 4 layers of data. In the non-limiting embodiment shown in FIG. 3, the 4 layers are as follows: 1) layer 1—docID—e.g., the document identifier, which may be a string matching the query or part of it (310); 2) layer 2—break ID—line (lemmas, propositions) documents (320); 3) layer 3—regionID—the regions of querying users (330); and 4) layer 4—sourceID—data from the annotated resource (e.g., title, URL, link, etc.) (340).

It should be understood that a particular resource may be referenced or identified in many different ways in annotated search index 300. The method of annotation is not meant to be particularly limited. As an example, a resource such as related doc 280 may be annotated using one or more of the following (without limitation): 1) user's query or a part of the query (for example, after having received a response to query1 210, the user transitioned to related doc 280; this query or its key words can be used as annotation to any other queries); 2) text of a link to related doc 280, which text may be related to the related doc 280. The link can contain, for example, key words, synonyms, a URL similar to the words of query1 210, a tag, and the like; 3) text located before and/or after a link, which link is related to related doc 280; 4) a heading of an article in Wikipedia; 5) a fragment of the description of a site in a catalog of web resources or in an index of queries, and the like; 6) a tweet, e.g., text of a tweet related to related doc 280. Many other references and identifiers may be used. It will be understood that each reference and identifier brings a signal which allows finding related doc 280 in response to query1 210.

Although the embodiment shown in FIG. 3 depicts a 4D data array 305, it should be expressly understood that the present technology is not limited to annotated search indexes comprising a 4D data array. For example, in one embodiment, as mentioned above, an annotated search index may comprise an extension of an existing inverted index, e.g., where the inverted index 230 is annotated by inserting references to related doc 280 in the appropriate posting list(s). In some non-limiting embodiments, the inverted index 230 is a link index. A link index is based not on the content of the documents but instead on the text of links to the documents. If a search term is present in the text of links to a document, the document will be posted in the posting list for the search term. Typically each entry in a link index contains data about the linked webpage such as language, region, owner of source links, creation date, other links, and the like. In alternative non-limiting embodiments, an annotated search index may comprise a data array having two (2D data array) or three layers of data (3D data array). Other implementations are known and are meant to be encompassed by the present technology.

Figure 4:
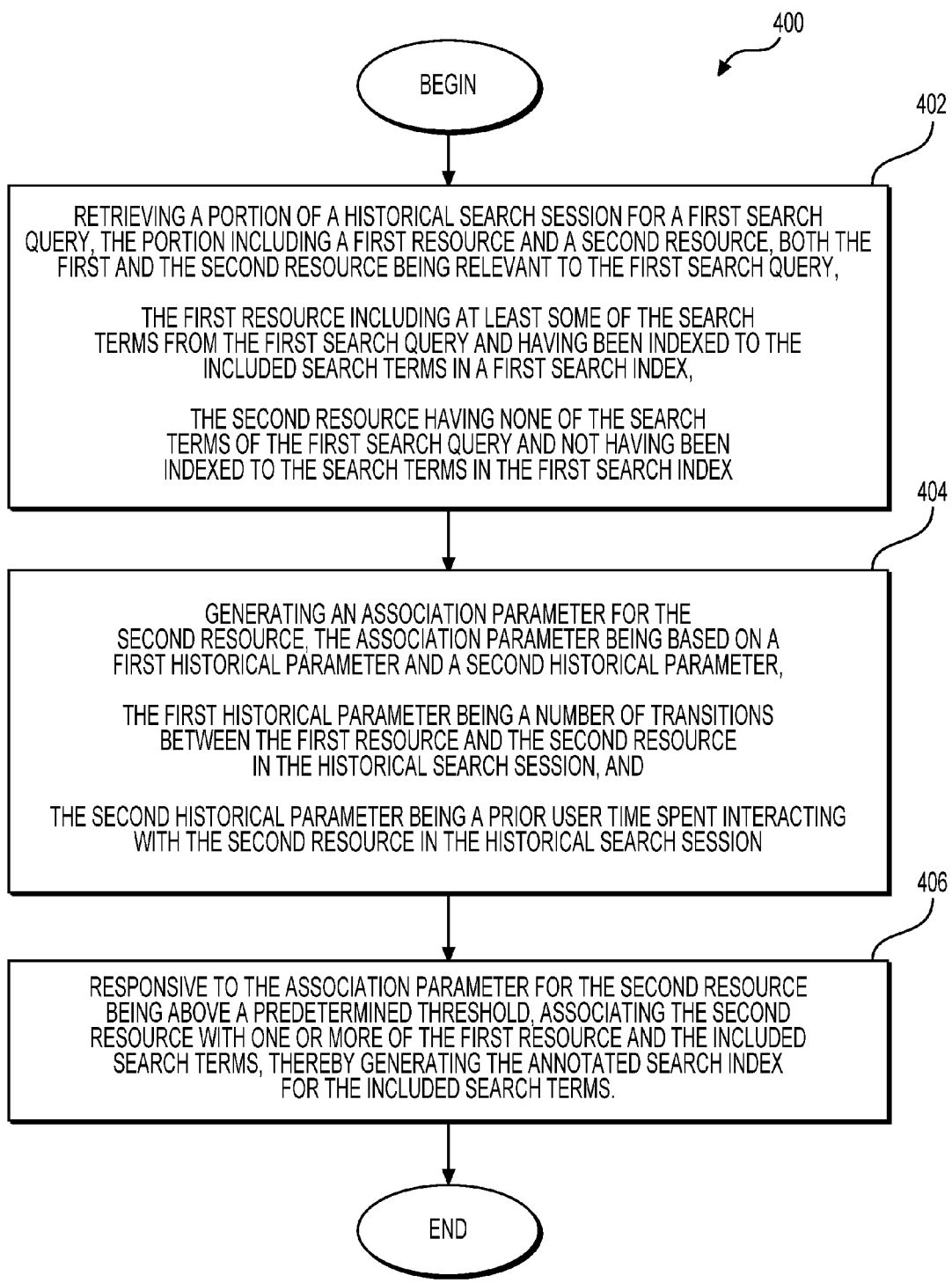
FIG. 4 depicts a block diagram of a method, the method being executable within the system of FIG. 1 and being implemented in accordance with non-limiting embodiments of the present technology.

Reference will now be made to FIG. 4, which depicts a block diagram of a method 400, the method 400 being implemented in accordance with non-limiting embodiments of the present technology. The method 400 can be conveniently executed at server 116.

Step 402—retrieving a portion of a historical search session for a first search query, the portion including a first resource and a second resource, both the first and the second resource being relevant to the first search query The method 400 begins at step 402, where a server 116 retrieves a portion of a historical search session 200 for a first search query ("query1") 210. The portion of the historical search session 200 includes a first resource ("doc1") 220, and a second resource ("related doc") 280, both doc1 220 and related doc 280 being relevant to the query1 210.

The first resource ("doc1") 220 includes at least some of the search terms from query1 210, having been indexed to the included search terms in a first search index. In some embodiments, the first search index is inverted index 230. Inverted index 230 is not meant to be particularly limited. For example, it may be a record level inverted index (containing a list of references to documents for each search term), a word level inverted index (additionally containing the positions of each word within a document), a link index (containing a list of references to links containing each search term), and the like.

The second resource ("related doc") 280 does not contain search terms from query1 210, and has not been indexed to the search terms in query1 210 in the first search index, e.g., inverted index 230. Thus, related doc 280 may not have an obvious connection to query1 210, lacking for example any of the search terms in query1 210. Therefore related doc 280 was not retrieved and displayed on search result interface 108 in response to query1 210 in the historical search session 200. Nevertheless, the historical search session 200 indicates that related doc 280 is relevant to query1 210 (relevancy is determined based on the association parameter for related doc 280, as discussed below).

In some embodiments, the first resource and the second resource are a document (e.g., doc1 220 and related doc 280 respectively). However the type of resource is not particularly limited. As a non-limiting example, the first resource and the second resource may be, independently, a document, an image, an audio file, a web page, a tweet, a link, a document heading, or a document fragment. It should be expressly understood that the first resource and the second resource may or may not be the same type of resource. For example, the first resource and the second resource may both be documents. Alternatively, the first resource may be a document and the second resource may be an image. Many other permutations are possible and are encompassed by the present technology.

Step 404—generating an association parameter for the second resource, the association parameter being based on a first historical parameter and a second historical parameter Continuing with step 404 of the method 400, an association parameter for the second resource ("related doc") 280 is generated. The association parameter is based on a first historical parameter and a second historical parameter.

The first historical parameter is the number of transitions between the first resource ("doc1") 220 and the second resource ("related doc") 280 in the historical search session 200. In the embodiment shown in FIG. 2, the first historical parameter is 3, since there are three transitions between doc1 220 and related doc 280 (a first transition from doc1 220 to query2 240; a second transition from query2 240 to doc2 260; and a third transition from doc2 260 to related doc 280). It is noted that there is one transition from query1 210 to doc1 220, query1 210 and doc1 220 being indexed together on a posting list in inverted index 230. It should be expressly understood that the first historical parameter is not limited to 3 and will vary depending on many factors such as, for example, the particular search query, the particular historical search session, the relevancy of a resource to the search query, and the like. In some embodiments, the first historical parameter is 1. In some embodiments, the first historical parameter is 2. In some embodiments, the first historical parameter is 3. In some embodiments, the first historical parameter is one of 1, 2, and 3.

The second historical parameter is the prior user time spent interacting with the second resource ("related doc") 280, in the historical search session 200. The amount of time a user spends interacting with related doc 280 provides one measure of relevancy of the related doc 280. In general, the longer the time the user spends interacting with related doc 280, the higher the relevancy of related doc 280.

Step 406—responsive to the association parameter for the second resource being above a predetermined threshold, associating the second resource with one or more of the first resource and the included search terms, thereby generating the annotated search index for the included search terms Continuing with step 406 of the method 400, the annotated search index 300 is generated responsive to the association parameter for related doc 280 being above a predetermined threshold. In some embodiments, the association parameter is above the predetermined threshold when, in the historical search session 200, the first historical parameter is one of 1, 2, and 3 transitions and the second historical parameter is at least 30 seconds. In other embodiments, the association parameter is above the predetermined threshold when, in the historical search session 200, the first historical parameter is one of 1 and 2 transitions and the second historical parameter is at least 30 seconds. In some embodiments, in the historical search session 200, the number of transitions between query1 210 and doc1 220 is one. However, it should be understood that in alternate embodiments, the number of transitions between query1 210 and doc1 220 may be more than one, e.g., two or three, particularly if there are other indicators of high relevance of related doc 280 (e.g., the second historical parameter is much greater than 30 seconds, or the first historical parameter is one, indicating a close link between related doc 280 and doc1 220).

Responsive to the association parameter for related doc 280 being above the predetermined threshold, the related doc 280 is associated with one or more of the doc1 220 and the included search terms, thereby generating the annotated search index 300 for the included search terms. In some embodiments, the related doc 280 is associated with, e.g., annotated to, the included search terms. In some embodiments, the related doc 280 is associated with, e.g., annotated to, the doc1 220. In some embodiments, the related doc 280 is associated with, e.g., annotated to, both the included search terms and the doc1 220 in the annotated search index 300.

As discussed above, the method of associating related doc 280 with one or more of the doc1 220 and the included search terms is not meant to be particularly limited. For example, in some embodiments, the first search index is inverted index 230, and doc1 220 and the included search terms are associated together in a posting list(s) in inverted index 230. The annotated search index 300 may then be generated by inserting a reference to related doc 280 into the appropriate posting list(s) in inverted index 230. In alternative embodiments, the annotated search index 300 is generated by associating related doc 280 with one or more of the doc1 220 and the included search terms in a second search index, e.g., 4D data array 305.

The reference or identifying information used to annotate a particular resource, e.g., related doc 280, is also not particularly limited. As discussed above, in some embodiments the reference or identifying information is one or more of docID, breakID, regionID, and source ID, e.g., URLs, links, titles of documents, etc.

Again, it should be understood that the procedure set forth above is simply an illustrative embodiment of the present technology. It is not intended to define or limit the scope of the present technology.

Some technical effects of non-limiting embodiments of the present technology may include provision of more complete search results to a user in response to the user entering a search query. Resources that are of interest to the user but not obviously connected with the search query may be retrieved and displayed on the SERP. Such resources may include, for example, documents that do not contain search terms in the search query, e.g., picture-diagrams not including any text signs of relevance to the search query. This provision of resources can allow the user to find more efficiently the information he or she is looking for and to delve more deeply into a subject of interest. Ability for the user to more efficiently find information results in less bandwidth usage. Also, with the electronic device 102 being implemented as a wireless communication device, ability to more efficiently find information would result in conservation of battery power of the electronic device 102. It can also provide the user with a more attractive or interesting search interface or search results page. It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

Accordingly, embodiments described above can be summarized as follows, presented in numbered clauses.

CLAUSE 1. A method (400) of generating an annotated search index (300), the method executable at a server (116), the method comprising:

a) retrieving a portion of a historical search session (200) for a first search query (210), the portion including a first resource (220) and a second resource (280), both the first and the second resource (220, 280) being relevant to the first search query (210), the first resource (220) including at least some of the search terms from the first search query (210) and having been indexed to the included search terms in a first search index (230), the second resource (280) having none of the search terms of the first search query (210) and not having been indexed to the search terms in the first search index (230);

b) generating an association parameter for the second resource (280), the association parameter being based on a first historical parameter and a second historical parameter, the first historical parameter being a number of transitions between the first resource (220) and the second resource (280) in the historical search session (200), and the second historical parameter being a prior user time spent interacting with the second resource (280) in the historical search session (200); and, c) responsive to the association parameter for the second resource (280) being above a predetermined threshold, associating the second resource (280) with one or more of the first resource (220) and the included search terms, thereby generating the annotated search index (300) for the included search terms.

CLAUSE 2. The method of clause 1, wherein the association parameter is above the predetermined threshold when the first historical parameter is one of 1, 2, and 3 transitions and the second historical parameter is at least 30 seconds.

CLAUSE 3. The method of clause 2, wherein the association parameter is above the predetermined threshold when the first historical parameter is one of 1 and 2 transitions and the second historical parameter is at least 30 seconds.

CLAUSE 4. The method of clause 2 or 3, wherein the number of transitions between the first search query (210) and the first resource (220) is one.

CLAUSE 5. The method of any one of clauses 1 to 4, wherein the second resource (280) is one of: a document, an image, an audio file, a web page, a tweet, a link, a document heading, and a document fragment.

CLAUSE 6. The method of any one of clauses 1 to 5, wherein, in step c), the second resource (280) is associated with both the first resource (220) and the included search terms.

CLAUSE 7. The method of clause 6, wherein the first search index (230) is an inverted index; the first resource (220) and the included search terms are associated together in a posting list(s) in the inverted index (230); and in step c) a reference to the second resource (280) is inserted into the appropriate posting list(s) in the inverted index (230), thereby generating the annotated search index (300).

CLAUSE 8. The method of any one of clauses 1 to 7, wherein, in step c), the second resource (280) is associated with the one or more of the first resource (220) and the included search terms in a second search index, the generated annotated search index (300) comprising the second search index and being distinct from the first search index (230).

CLAUSE 9. The method of clause 8, wherein the second search index is a data array (305) having 3 or 4 dimensions.

CLAUSE 10. The method of clause 9, wherein the 3 or 4 dimensions comprise one or more of docID (310), breakID (320), regionID (330), and sourceID (340).

CLAUSE 11. A server (116) comprising:
a communication interface for communication via a communication network with a search cluster (118) having access to a database (122);
a memory storage;
a processor operationally connected with the communication interface and the memory storage, the processor configured to store objects on the memory storage, the processor being further configured to:
a) retrieve a portion of a historical search session (200) for a first search query (210), the portion including a first resource (220) and a second resource (280), both the first and the second resource (220, 280) being relevant to the first search query (210),
the first resource (220) including at least some of the search terms from the first search query (210) and having been indexed to the included search terms in a first search index (230),
the second resource (280) having none of the search terms of the first search query (210) and not having been indexed to the search terms in the first search index (230);
b) generate an association parameter for the second resource (280), the association parameter being based on a first historical parameter and a second historical parameter, the first historical parameter being a number of transitions between the first resource (220) and the second resource (280) in the historical search session (200), and
the second historical parameter being a prior user time spent interacting with the second resource (280) in the historical search session (200); and,
c) responsive to the association parameter for the second resource (280) being above a predetermined threshold, associate the second resource (280) with one or more of the first resource (220) and the included search terms, thereby generating an annotated search index (300) for the included search terms.

CLAUSE 12. The server (116) of clause 11, wherein the association parameter is above the predetermined threshold when the first historical parameter is one of 1, 2, and 3 transitions and the second historical parameter is at least 30 seconds.

CLAUSE 13. The server (116) of clause 12, wherein the association parameter is above the predetermined threshold when the first historical parameter is one of 1 and 2 transitions and the second historical parameter is at least 30 seconds.

CLAUSE 14. The server (116) of clause 12 or 13, wherein the number of transitions between the first search query (210) and the first resource (220) is one.

CLAUSE 15. The server (116) of any one of clauses 11 to 14, wherein the second resource (280) is one of: a document, an image, an audio file, a web page, a tweet, a link, a document heading, and a document fragment.

CLAUSE 16. The server (116) of any one of clauses 11 to 15, wherein the processor is configured to associate the second resource (280) with both the first resource (220) and the included search terms in step c).

CLAUSE 17. The server (116) of clause 16, wherein the first search index (230) is an inverted index; the first resource (220) and the included search terms are associated together in a posting list(s) in the inverted index (230); and the processor is configured to insert a reference to the second resource (280) into the appropriate posting list(s) in the inverted index (230) in step c), thereby generating the annotated search index (300).

CLAUSE 18. The server (116) of any one of clauses 11 to 17, wherein the processor is configured to associate the second resource (280) with the one or more of the first resource (220) and the included search terms in a second search index in step c), the generated annotated search index (300) comprising the second search index and being distinct from the first search index (230).

CLAUSE 19. The server of clause 18, wherein the second search index is a data array (305) having 3 or 4 dimensions.

CLAUSE 20. The server of clause 19, wherein the 3 or 4 dimensions comprise one or more of docID (310), breakID (320), regionID (330), and sourceID (340).

The invention claimed is:
1. A method of generating an annotated search index, the method executable at a server having a processor and memory, the method comprising:
a) retrieving a portion of a historical search session for a first search query, the portion including a first resource and a second resource, both the first and the second resource being relevant to the first search query,
the first resource including at least some of the search terms from the first search query and having been indexed to the included search terms in a first search index,
the second resource being associated with a reformulated query in the historical search session, the second resource having none of the search terms of the first search query and not having been indexed to the search terms in the first search index, the second resource having been accessed after the first resource in the historical search session by at least one user after submitting the reformulated query;

b) generating an association parameter for the second resource, the association parameter being based on a first historical parameter and a second historical parameter, the first historical parameter being a number of transitions between the first resource and the second resource in the historical search session, and the second historical parameter being a prior user time spent interacting with the second resource in the historical search session; and, c) responsive to the association parameter for the second resource being above a predetermined threshold, associating the second resource with one or more of the first resource and the included search terms;

d) generating an entry in the annotated search index, the entry comprising the second resource being associated with one or more of the first resource and the included search terms, the entry in the annotated search index rendering the second resource to be discoverable with the one or more of the first resource and the included search terms in the annotated search index.

2. The method of claim 1, wherein the association parameter is above the predetermined threshold when the first historical parameter is one of 1, 2, and 3 transitions and the second historical parameter is at least 30 seconds.

3. The method of claim 2, wherein the association parameter is above the predetermined threshold when the first historical parameter is one of 1 and 2 transitions and the second historical parameter is at least 30 seconds.

4. The method of claim 2, wherein the number of transitions between the first search query and the first resource is one.

5. The method of claim 1, wherein the second resource is one of: a document, an image, an audio file, a web page, a tweet, a link, a document heading, and a document fragment.

6. The method of claim 1, wherein, in step c), the second resource is associated with both the first resource and the included search terms.

7. The method of claim 6, wherein the first search index is an inverted index; the first resource and the included search terms are associated together in a posting list(s) in the inverted index; and in step c) a reference to the second resource is inserted into the appropriate posting list(s) in the inverted index, thereby generating the annotated search index.

8. The method of claim 1, wherein, in step c), the second resource is associated with the one or more of the first resource and the included search terms in a second search index, the generated annotated search index comprising the second search index and being distinct from the first search index.

9. The method of claim 8, wherein the second search index is a data array having 3 or 4 dimensions.

10. The method of claim 9, wherein the 3 or 4 dimensions comprise one or more of docID, breakID, regionID, and sourceID.

11. A server comprising:
a communication interface for communication via a communication network with a search cluster having access to a database;
a memory storage;
a processor operationally connected with the communication interface and the memory storage, the processor configured to store objects on the memory storage, the processor being further configured to:
a) retrieve a portion of a historical search session for a first search query, the portion including a first resource and a second resource, both the first and the second resource being relevant to the first search query,
the first resource including at least some of the search terms from the first search query and having been indexed to the included search terms in a first search index,
the second resource being associated with a reformulated query in the historical search session, the second resource having none of the search terms of the first search query and not having been indexed to the search terms in the first search index;
b) generate an association parameter for the second resource, the association parameter being based on a first historical parameter and a second historical parameter,
the first historical parameter being a number of transitions between the first resource and the second resource in the historical search session, and
the second historical parameter being a prior user time spent interacting with the second resource in the historical search session; and,
c) responsive to the association parameter for the second resource being above a predetermined threshold, associate the second resource with one or more of the first resource and the included search terms;
d) generate an entry in the annotated search index, the entry comprising the second resource being associated with one or more of the first resource and the included search terms, the second resource being discoverable with the one or more of the first resource and the included search terms in the annotated search index.

12. The server of claim 11, wherein the association parameter is above the predetermined threshold when the first historical parameter is one of 1, 2, and 3 transitions and the second historical parameter is at least 30 seconds.

13. The server of claim 12, wherein the association parameter is above the predetermined threshold when the first historical parameter is one of 1 and 2 transitions and the second historical parameter is at least 30 seconds.

14. The server of claim 12, wherein the number of transitions between the first search query and the first resource is one.

15. The server of claim 11, wherein the second resource is one of: a document, an image, an audio file, a web page, a tweet, a link, a document heading, and a document fragment.

16. The server of claim 11, wherein the processor is configured to associate the second resource with both the first resource and the included search terms in step c).

17. The server of claim 16, wherein the first search index is an inverted index; the first resource and the included search terms are associated together in a posting list(s) in the inverted index; and the processor is configured to insert a reference to the second resource into the appropriate posting list(s) in the inverted index in step c), thereby generating the annotated search index.

18. The server of claim 11, wherein the processor is configured to associate the second resource with the one or more of the first resource and the included search terms in a second search index in step c), the generated annotated search index comprising the second search index and being distinct from the first search index.

19. The server of claim 18, wherein the second search index is a data array having 3 or 4 dimensions.

20. The server of claim 19, wherein the 3 or 4 dimensions comprise one or more of docID, breakID, regionID, and sourceID.

* * * * *